United States Patent
Vasseur et al.

(10) Patent No.: US 7,801,137 B2
(45) Date of Patent: Sep. 21, 2010

(54) RECEIVER-BASED CONSTRUCTION OF POINT-TO-MULTIPOINT TREES USING PATH COMPUTATION ELEMENTS IN A COMPUTER NETWORK

(75) Inventors: Jean-Philippe Vasseur, Dunstable, MA (US); Stefano B. Previdi, Rome (IT); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 12/045,749

(22) Filed: Mar. 11, 2008

(65) Prior Publication Data

US 2009/0232031 A1    Sep. 17, 2009

(51) Int. Cl.
*H04L 12/28* (2006.01)
(52) U.S. Cl. ...................................... 370/390
(58) Field of Classification Search .................. None
See application file for complete search history.

(56) References Cited

U.S. PATENT DOCUMENTS

| 7,016,351 | B1 | 3/2006 | Farinacci et al. |
| 7,031,262 | B2 | 4/2006 | Vasseur et al. |
| 7,058,016 | B1 | 6/2006 | Harper |
| 7,065,079 | B1 | 6/2006 | Patra et al. |
| 7,304,954 | B1 | 12/2007 | Gupta et al. |
| 2006/0039391 | A1 | 2/2006 | Vasseur et al. |
| 2006/0221859 | A1* | 10/2006 | Bijwaard et al. ............ 370/254 |
| 2007/0025277 | A1 | 2/2007 | Sajassi et al. |
| 2007/0253432 | A1 | 11/2007 | Regale et al. |
| 2008/0049751 | A1 | 2/2008 | Venkat et al. |
| 2008/0123650 | A1* | 5/2008 | Bhaskar ..................... 370/392 |
| 2008/0205394 | A1* | 8/2008 | Deshpande et al. ......... 370/390 |
| 2009/0036152 | A1* | 2/2009 | Janneteau et al. .......... 455/503 |
| 2009/0161675 | A1* | 6/2009 | Aggarwal et al. .......... 370/390 |

* cited by examiner

*Primary Examiner*—Chirag G Shah
*Assistant Examiner*—Amarnauth Persaud
(74) *Attorney, Agent, or Firm*—Cesari and McKenna, LLP (57) ABSTRACT

In one embodiment, a trigger to add a leaf node to a multicast group of a computer network is detected, and the leaf node may determine a root node of the multicast group to request a path between a tunnel tree and the leaf node of the multicast group. In response to the multicast group having an existing tree, a reply is received from the root node with a computed path to add the leaf node to the tree at a selected node of the tree. The leaf node may then be added to the multicast group tunnel tree over the computed path at the selected node.

21 Claims, 7 Drawing Sheets

MULTICAST GROUP JOIN
REQUEST (PIM JOIN)
300

HEADERS
305

SOURCE (END USER)
310

GROUP (S,G)
315

OPTIONS
320

FIG. 3

PATH REQUEST/REPLY
(PCREQ/PCREP) MESSAGE
400

HEADERS
405

SVEC
410

MULTICAST FIELD
415

PATH (REQUEST/REPLY)
420

RECEIVER-BASED CONSTRUCTION OF POINT-TO-MULTIPOINT TREES USING PATH COMPUTATION ELEMENTS IN A COMPUTER NETWORK

TECHNICAL FIELD

The present disclosure relates generally to computer networks, and, more particularly, to construction of Point-to-Multipoint (P2MP) trees.

BACKGROUND

Service providers often use (or plan to deploy) tunnels to carry some of their multicast traffic (e.g., video). For example, one type of tunnel that may be used is a point-to-multipoint (P2MP) Multi-Protocol Label Switching Traffic Engineering Label Switched Path (MPLS-TE LSP). In some cases, the multicast (video) traffic is carried onto two diverse paths (tunnels) from a source (or "root") node to each destination (or "leaf") node of the multicast tunnel (e.g., a "tree"). The destination nodes (e.g., receivers or end-user stations) may then select their particular multicast traffic of interest, thus offering a reliable traffic delivery solution.

Currently, the set of leaf nodes (or "leaves") is statically configured, such as by a system administrator or other configuration process. A path computation algorithm may then be performed on a head-end node of the tunnel (e.g., the source/root node) based on various constraints, and the resulting P2MP tunnel is signaled/established. Such a solution is effective in terms of bandwidth management, leading to an optimized usage of resources in the network, but is also fairly cumbersome and requires heavy (e.g., manual) configuration of the head-end.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a trigger to add a leaf node to a multicast group of a computer network is detected, and the leaf node may determine a root node of the multicast group to request a path between the tunnel tree of the multicast group and the leaf node. In response to the multicast group having an existing tree, a reply is received from the root node with a computed path to add the leaf node to the tree at a selected node of the tree. The leaf node may then be added to the multicast group tunnel tree over the computed path at the selected node.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
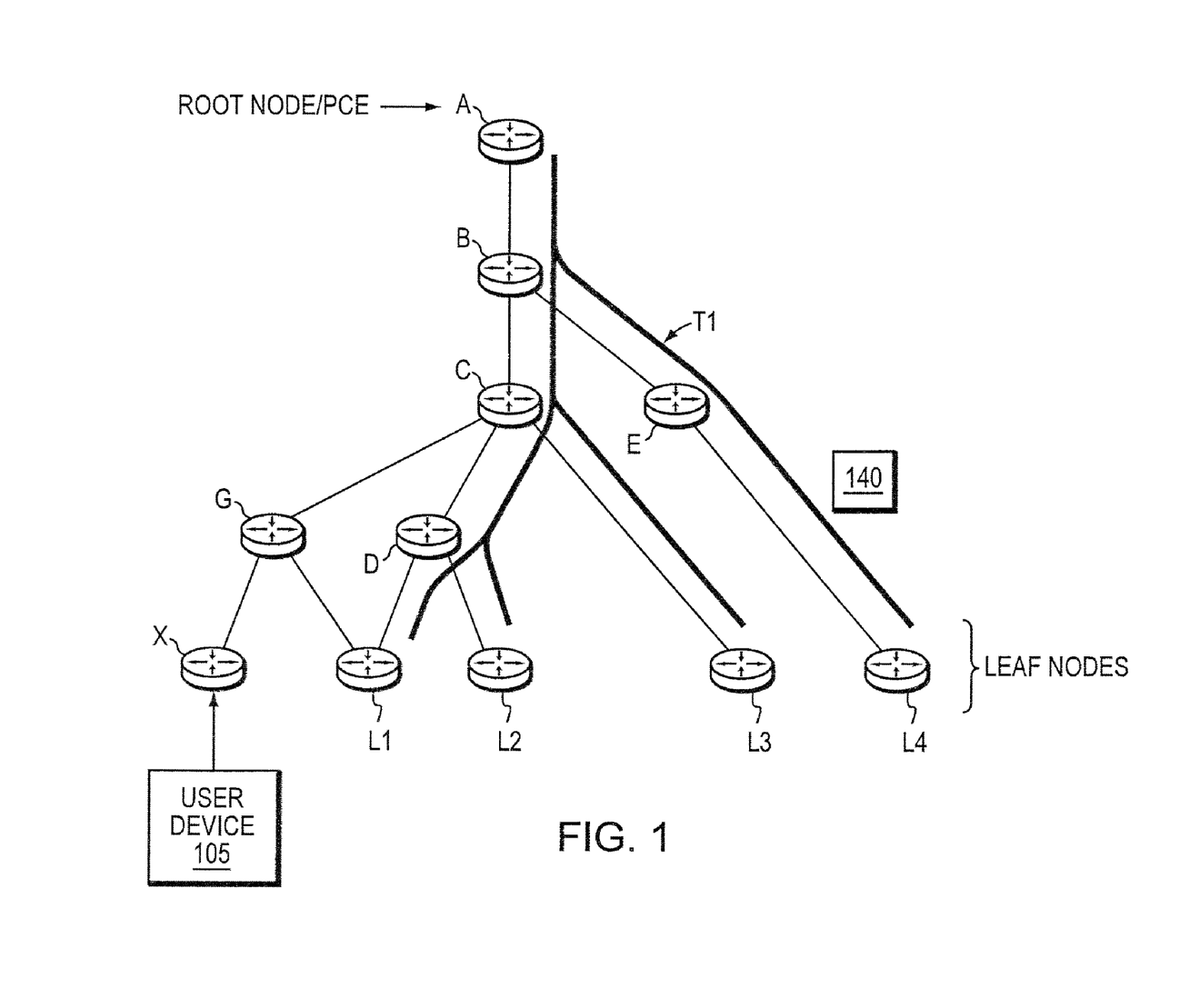
FIG. 1 illustrates an example computer network.

FIG. 1 is a schematic block diagram of an example computer network 100 illustratively comprising nodes/devices, such as one or more nodes (e.g., routers) A-E, G, X, and L1-L4 interconnected by links as shown. Those skilled in the art will understand that any number of nodes, devices, links, etc. may be used in the computer network, and that the view shown herein is for simplicity. Those skilled in the art will also understand that while the embodiments described herein are described generally, they may apply to any network configuration within an Autonomous System (AS) or area, or throughout multiple ASes or areas, etc.

Data packets 140 (e.g., traffic/signaling) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS), etc.

Figure 2:
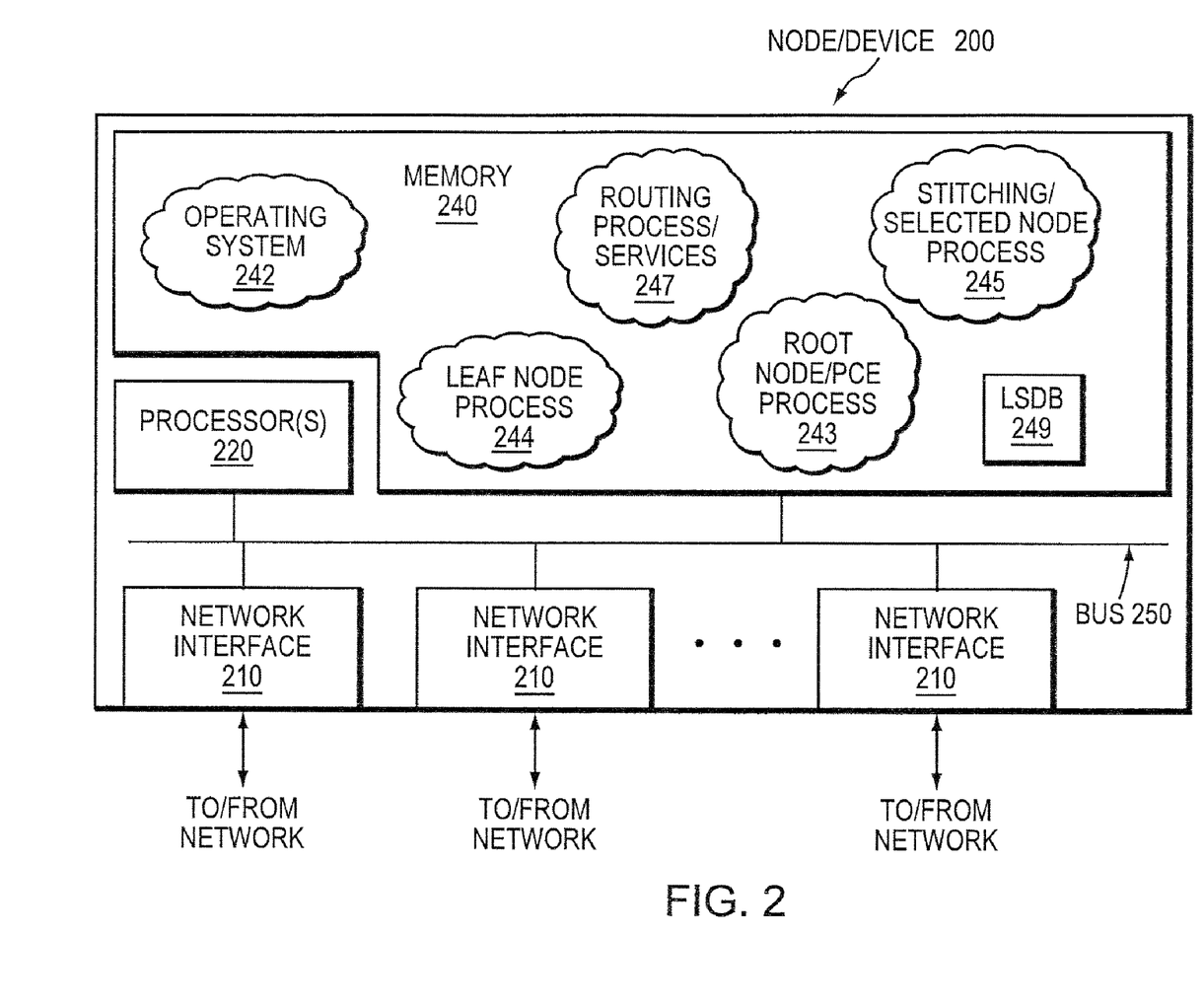
FIG. 2 illustrates an example network device/node.

FIG. 2 is a schematic block diagram of an example node/device 200 that may be advantageously used with one or more embodiments described herein, e.g., as a router (such as a root node or leaf node). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as a link state database (LSDB) 249. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 247, and depending on the device's role within a tunnel tree as described herein, one or more of a root node (path computation element or "PCE") process 243, a leaf node process 244, and a stitching node process 245. It will be apparent to those skilled in the art that other processor and memory types, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage one or more information databases (such as LSDB 249) containing, e.g., data used to make forwarding (routing/switching) decisions. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances (not shown), or tunneling protocols, such as for MPLS, etc., each as will be understood by those skilled in the art.

As noted, service providers (e.g., of network 100) can use tunnels, e.g., point-to-multipoint (P2MP) MPLS Traffic Engineering Label Switched Paths (MPLS-TE LSPs) to carry multicast traffic. By optionally using two diverse tunnels, referred to as the "1+1" solution, multicast (e.g., video) traffic is carried onto two diverse tunnels from a source/root node (e.g., node A) to each receiver/leaf node (e.g., L1-L4) of the multicast tunnel/tree (e.g., T1). (As may be appreciated by those skilled in the art, several known algorithms may be used to compute diverse P2MP trees, such as KMB, MIP, MSPC, PMST, SCTF, SPH, etc.) One problem associated with current usage of P2MP trees, however, is that the set of leaf nodes is statically configured, and a path computation algorithm for the entire P2MP tree is performed on the head-end node of the tunnel. Again, such a solution is effective in terms of bandwidth management, leading to an optimized usage of resources in the network, but is also fairly cumbersome and requires heavy (e.g., manual) configuration of the head-end. In particular, to perform such a path computation all of the leaves to be a part of the tunnel must be known in advance of the computation, where new leaves may require a complete recomputation of the tree.

Constructing Receiver-Based P2MP Tunnels

According to embodiments of the disclosure, a dynamic mechanism is used to add new leaves (tail-end nodes) to a set of diverse Point-to-Multipoint (P2MP) tunnels in a computer network. In particular, the techniques dynamically add leaves to P2MP tunnels for a set of multicast groups as multicast group join requests are received. Upon receiving a join request, the leaf requests a path for addition to the P2MP tree from the root node (head-end node) of the P2MP tree. The root node is used as a path computation element (PCE), which allows for an optimized P2MP tree, and the returned path is used to establish an additional tunnel segment between the P2MP tree and the leaf node. The node where the new tunnel is added to the P2MP tree may then "stitch" (connect) the tunnel to the leaf node to the P2MP tree to allow for multicast traffic for the group to reach the leaf node.

Illustratively, root node/PCE process 243, leaf node process 244, and stitching node process 245 may each be adapted to contain computer executable instructions executed by processor 220 to perform functions related to respective node functionalities of the root node, leaf node, and stitching node, as described in detail below. In particular, these process may be used as described herein to extend a multicast tree to dynamically add leaves as join request (PIM joins) are received by new receivers (user devices) while guaranteeing any path diversity constraints between diverse multicast trees, and with the objective of optimizing the bandwidth usage in the network. Notably, the root (head-end) node/PCE process 243 exploits its knowledge of network topology and resources available on each link to perform the path computation according to the Traffic Engineering constraints. Various path computation methodologies are available including CSPF (constrained shortest path first). Particularly, the PCE is an entity having the capability to compute paths between any nodes of which the PCE is aware in domain. PCEs are especially useful in that they are more cognizant of network traffic and path selection within their domain, and thus may be used for more optimal path computation.

Figure 3:
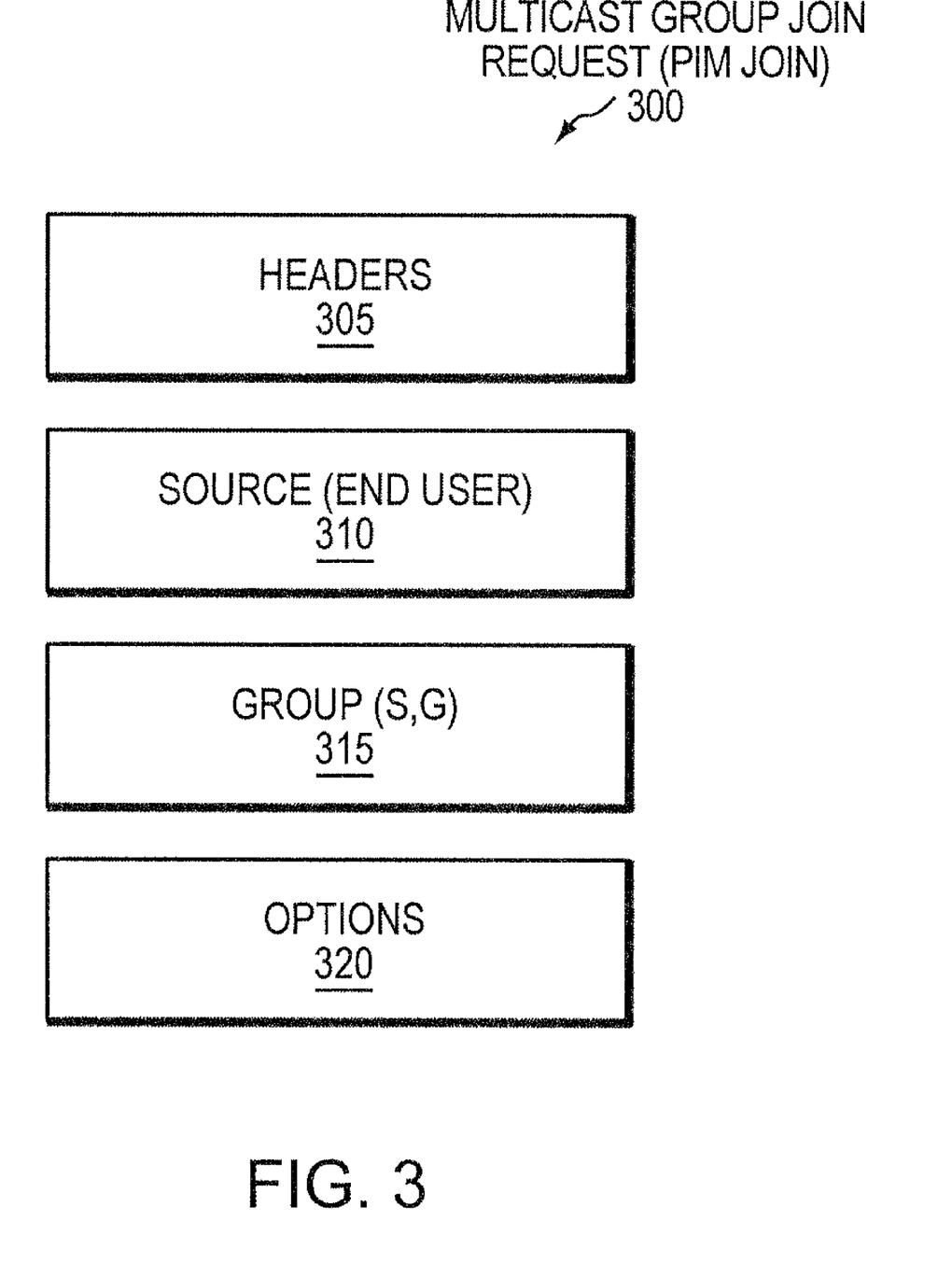
FIG. 3 illustrates an example join request message.

Operationally, according to one or more embodiments herein, a trigger is detected to add a leaf node a multicast group in the computer network. For instance, the leaf node (e.g., node X) may receive a multicast group join request, such as a Protocol Independent Multicast (PIM) join request, from an end receiver node (e.g., a user device 105) interconnected (locally attached) with the leaf node X. FIG. 3 illustrates an example (simplified) join request 300 (e.g., a PIM join) that may be received by leaf node X. For example, fields of the join request 300 may comprise one or more headers 305, the user device's address 310, the requested group or "(S,G)" 315 and zero or more options 320. (Those skilled in the art will understand that the format of the join request 300 is simplified for the purposes of illustration.) In response to the join request, the leaf node X (designated receiver router) may determine a root node of the multicast group, that is, the source router responsible for a source node (not shown) sourcing traffic for the multicast group (S,G). Illustratively, the leaf node may perform a lookup operation into its LSDB 249 to determine that A is the designated source node for the group (S,G).

Figure 4:
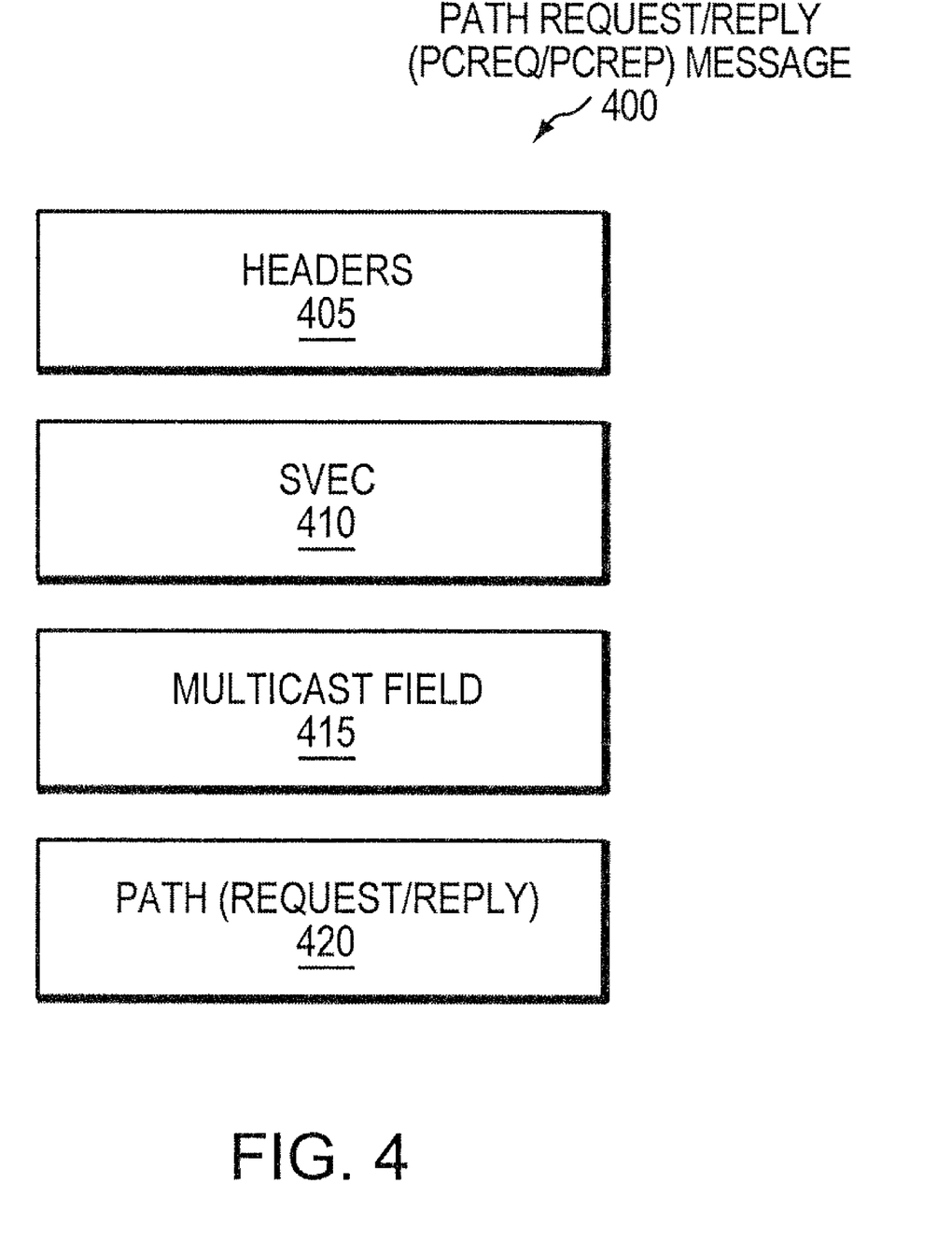
FIG. 4 illustrates an example path computation request/reply message.

Upon determining the source node (A), the leaf node X may request from the root node a path between the leaf node and a tunnel tree of the multicast group (that is, from the multicast group to the leaf node/receiver router). Illustratively, the leaf node may send a path computation request (PCReq) message to the root node, which may act as a path computation element (PCE) for the related tunnel. FIG. 4 illustrates an example PCReq (or reply, PCRep) message 400 that may be sent from the leaf node X to the root node A in accordance with one or more embodiments described herein. For example, the message 400 may comprise one or more fields, such as one or more headers 405, SVEC (Synchronization Vector) objects 410 (to correlate requests/replies, e.g., to allow diverse paths), a multicast field 415 to indicate the particular multicast group (S,G), and a path request/reply field 420. In particular, the PCReq message 400 may be used to request a computation of two diverse point-to-point (P2P) tunnels for the multicast group (S,G), where the source of the tunnel is unknown and the destination is leaf node X. (Note that modifications may be made to the PCReq message 400 to allow for an unknown source as used by one or more embodiments described herein.) In this manner, leaf node X essentially requests a P2P tunnel path that may be used to "stitch" a tunnel to an existing P2MP tunnel at a location that is to be determined by the root node of the P2MP tunnel acting as a PCE.

Specifically, upon receiving the PCReq message 400, the PCE (root node A) may first determine whether a tunnel tree (P2MP or P2P) exists for the multicast group (S,G) indicated in the request (field 415). If no tunnel currently exists for the multicast group, then the root node A (PCE) may compute a new tunnel (e.g., two diversely routed tunnels) to be signaled, since there is only the one new leaf node X, thus the "P2MP" multicast tunnel tree is a P2P tunnel at this stage. In other words, in response to the multicast group not having an existing tree, the root node may compute a P2P tree, and may return a request to the leaf node X to establish the tree from the root node to the leaf node, which may accordingly be established to add the leaf node to the multicast group tunnel tree.

Figure 5:
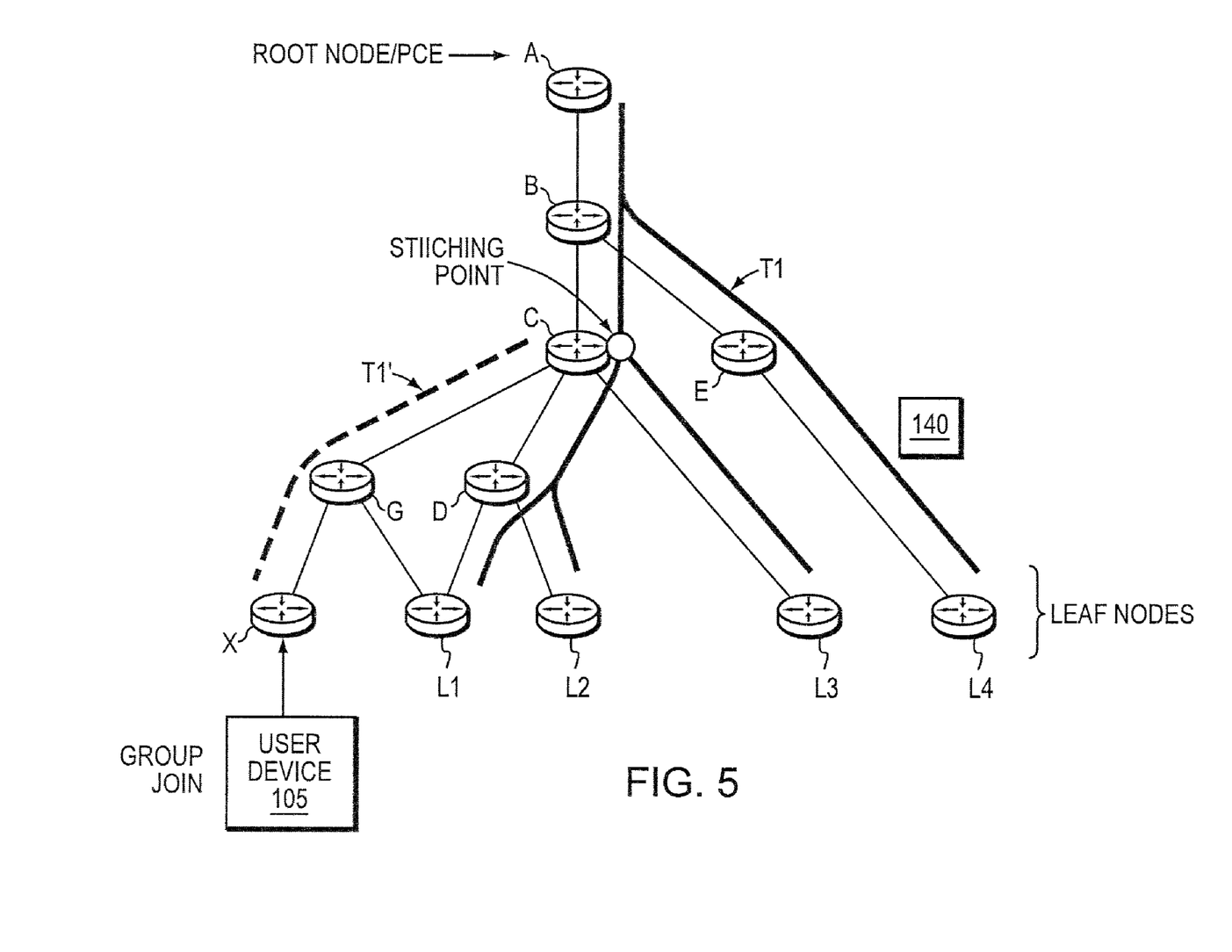
FIG. 5 illustrates an example computer network with a leaf node added to a multi-cast tree.

If, on the other hand, a tunnel/tree (T1) already exists for the multicast group (S,G) (or, notably, a set of diverse P2(M)P tunnels for (S,G) exists), the PCE/ root node A computes a path from the existing tunnel to the leaf node (or, again, a path from each of two existing diverse tunnels), illustratively that satisfies (satisfy) one or more constraints so as to optimize network resource usage. FIG. 5 illustrates the computer network 100 of FIG. 1 with an example "branch" path from P2MP T1. In the example, root node A may determine that a new branch T1' may be added to the multicast tunnel T1 from a selected node C on the tunnel to the leaf node X in order to add the leaf node the tree. (Note that a similar operation may be performed for a second diversely routed tunnel). Various path computation techniques may be used, such as those described above, to determine an optimal path to the leaf node based on the existing nodes of the tree. For example, while a selected node C has been chosen as the "best" location to stitch the additional tunnel (traversing intermediate node G), the stitching/selected node may be any node along the existing tunnel tree. Once the path is computed, the root node A may then send the computed path in a PCRep message 400 (in field 420) that is received by the leaf node X.

Upon receiving the PCRep message 400, leaf node X may illustratively signal (and establish) a bi-directional P2P tunnel T1' that specifies the multicast group (S,G) (e.g., as a additional novel LSP_ATTRIBUTE object of a conventional signaling message, such as Resource Reservation Protocol, or RSVP-TE messages) from leaf node X to selected/stitching node C according to the received computed path. In particular, the signaling messages specify the multicast group (S,G) so that the stitching node C may become aware of the tree to which the established tunnels should be stitched. (Note that while not all P2MP parameters need be given to stitching node C, at least the multicast group should be given so that the stitching node C can determine any necessary parameters to stitch the new tunnel). Accordingly, the new tunnel T1' adds the leaf node X to the multicast group tunnel tree T1 over the computed path at the selected node C.

Notably, a bi-directional tunnel T1' is used so that the head-end node of the bi-directional tunnel is the leaf node X and to allow multicast traffic to flow from the stitching node to the leaf node. That is, while labels may be assigned in both directions, only one direction of the tunnel (from node C to node X) need be used. Alternatively, a uni-directional tunnel may be used. To utilize a uni-directional tunnel, the leaf node may request from the selected/stitching node that a unidirectional tunnel (T1') be established from the stitching node C to the leaf node X, and that the stitched tunnel be added to the multicast tunnel T1. (According to one or more embodiments, however, the bi-directional tunnels may be used to supply feedback to the stitching nodes and/or the source/root node.)

Once aware, the selected/stitching node C adds the new branch (P2P) tunnel T1' as a portion of the existing tree (P2MP) T1 with a matching multicast group (S,G) assignment, thus extending the existing P2MP tunnel to leaf node X. The stitching/selected node C may be configured to transmit multicast group traffic (140) received on the P2MP tree T1 onto the branch/stitched tunnel T1' toward the added leaf node X. (Those skilled in the art will appreciate that such configuration may imply programming a forwarding database or "FIB" accordingly to replicate the traffic received from the upstream node to the added downstream node (e.g., from node C to node G)). In addition, the stitching node C may reflect the P2MP tunnel extension (branch tunnel T1') to the upstream nodes and root node A by refreshing a route record object (RRO) of conventional P2MP signaling messages.

Figure 6:
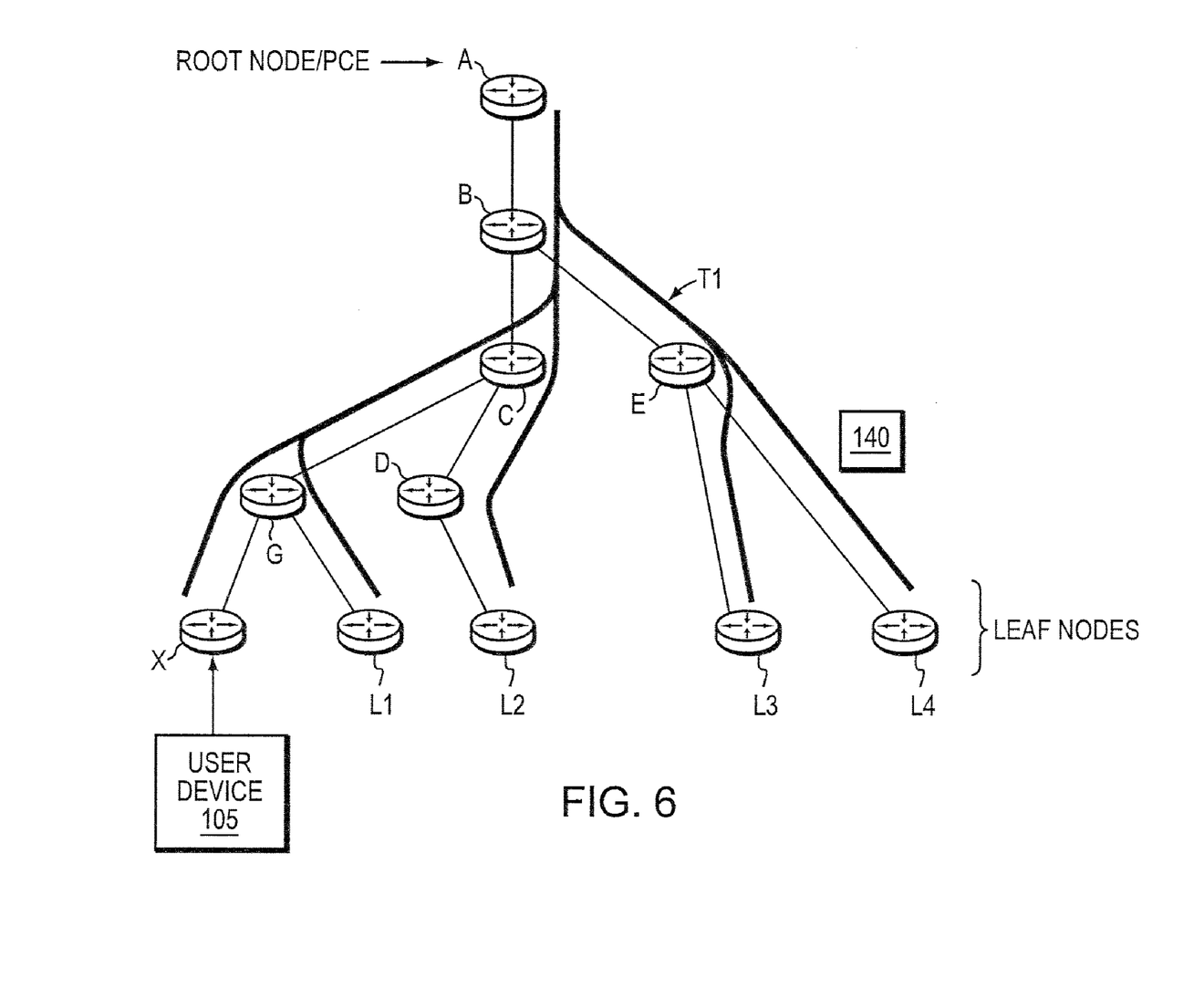
FIG. 6 illustrates an example computer network with a recomputation of a multi-cast tree.

Notably, upon receiving a PCReq message from a leaf node, the root node may alternatively determine that reoptimization of the current multicast tunnel tree may be beneficial. For instance, the decision may be based on an overall cost "gain" (optimized gain or cost reduction) as compared to a number of affected leaf nodes, or based on the cost gain compared to the inherent overhead of resignaling a P2MP tunnel tree, or other trade-off-based tuning (where satisfying the request of one node out-weighs any downside effects of other existing tunnels/nodes). As such, the root node A (the head-end node of the tree) may decide whether to recompute a P2MP tunnel to all of the current leaf nodes (e.g., L1-L4) and add the additional leaf node X, or to simply stitch the additional leaf node to the existing tree (as described above). In the event a reoptimization is triggered by the root node A, the "received reply" (PCRep 400) at the leaf node X may take the form of a notification that the root node A will establish an optimized tunnel tree that adds (includes) the leaf node to the multicast (P2MP) tree. Notably, in the event diverse tunnels exist, one or both of the tunnels may be reoptimized. (Note also, that upon reoptimization, existing bi-directional stitched/branch tunnels may be torn down, e.g., in a make-before-break manner, as may be appreciated by those skilled in the art.) FIG. 6 illustrates the computer network 100 with a reoptimized tree T1 as shown. For example, rather than simply stitching T1' at selected node C, the entire tree T1 is recomputed such that, e.g., leaf nodes X and L1 may be reached from intermediate node G, leaf node L2 from node C, and leaf nodes L3 and L4 from node E, accordingly.

Figure 7:
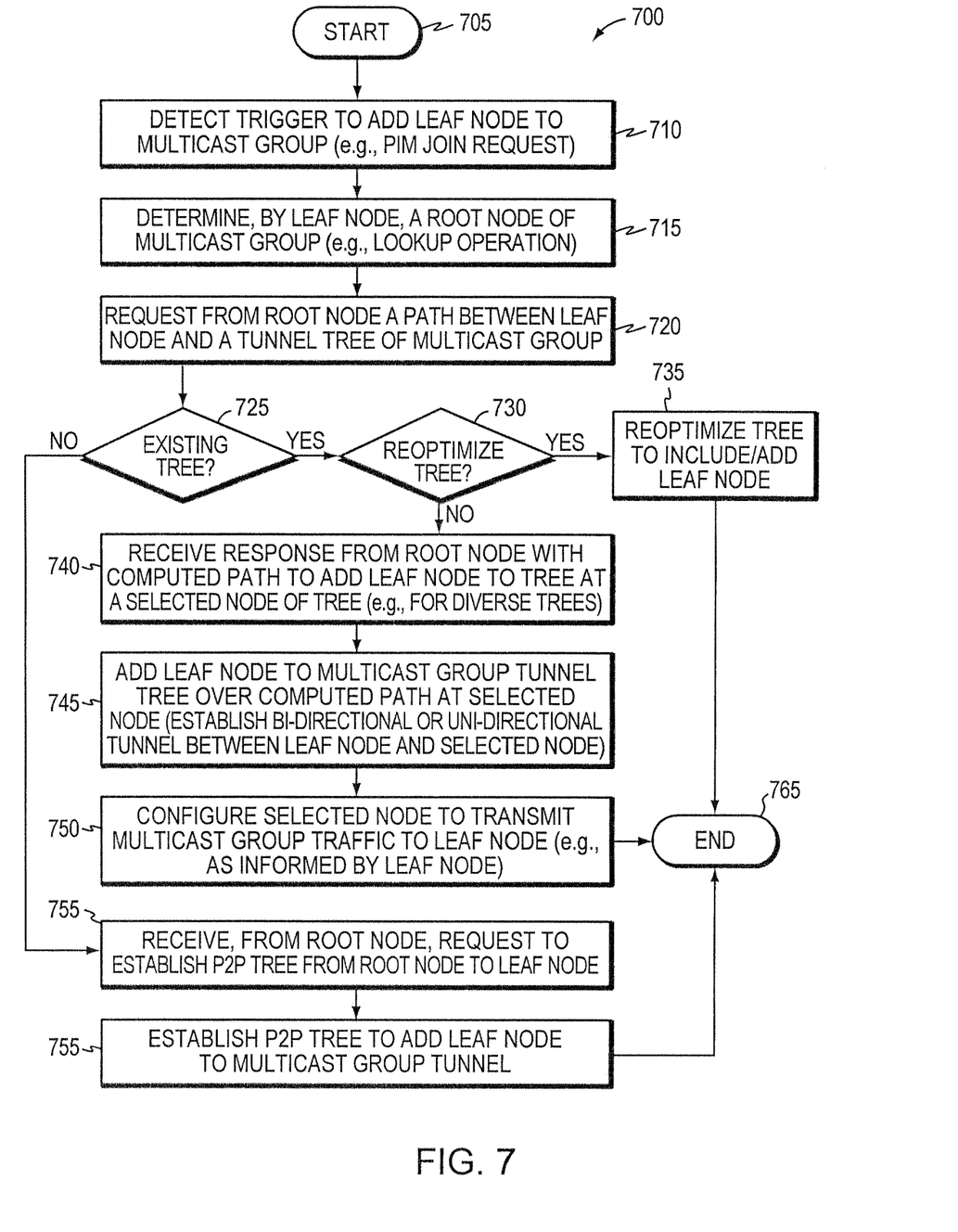
FIG. 7 illustrates an example procedure for receiver-based construction of a multi-cast tree.

FIG. 7 illustrates an example procedure for constructing receiver-based P2MP tunnels in accordance with one or more embodiments described herein. The procedure 700 starts at step 705, and continues to step 710, where a trigger to add a leaf node to multicast group (e.g., PIM join request) is detected, such as a received PIM join request 300 at leaf node X. In step 715, the leaf node X may determine an appropriate root node (e.g., node A) of the multicast group, such as based on a lookup operation (e.g., into an LSDB 249). The leaf node may then request (from the root node) a path between a tunnel tree of multicast group and the leaf node in step 720. For instance, as described above, a PCReq message 400 may be sent to the root node that requests addition of the leaf node to a tree for the multicast group specified within the request (e.g., field 415).

In step 725, the root node (A) may determine whether a tree exists for the requested multicast group, whether it is a P2P tree or a P2MP tree. If there is an existing tree in step 725 (e.g., T1), then in step 730 the root node may also (as mentioned above) determine whether to reoptimize the existing tree, for example, based on one or more values (e.g., cost, number of leaf nodes, etc.). If the determination is made to reoptimize the tree in step 730, then the root node may include/add the leaf node X to the reoptimized tree in step 735. If the tree is not to be reoptimized in step 730, then in step 740, the root node may generate and send a reply (PCRep 400 received at the leaf node) having the computed path to add the leaf node to the tree at a selected node of the tree. For instance, root node A may compute a path T1' from selected node C to leaf node X that may be added to the current tree T1. (Note that for diverse trees, a second path may also be computed for a second tree to add the leaf node, accordingly.)

The leaf node may be added to the multicast group tunnel tree over the computed path at the selected node in step 745, such as through establishment of a bi-directional tunnel or a uni-directional tunnel between the leaf node and the selected node as described above. Then, in step 750, the selected node may be configured to transmit multicast traffic to the leaf node over the newly established tunnel T1' (as an extension to the multicast tunnel T1), to be received by the leaf node, accordingly. For example, the leaf node may inform the selected node during establishment of the tunnel T1' that the tunnel is to be used for a particular multicast group's traffic, as mentioned above.

Alternatively, if at step 725 there is no existing tree for the multicast group, then in step 755, the root node A may compute and send a request (received by the leaf node X) to establish a P2P tree from the root node to the leaf node. In this manner, in step 760, the first tunnel (P2P tree) may be established for use with the multicast group (e.g., from which other tunnels may be added/appended). The procedure 700 ends in step 765.

Advantageously, the novel techniques described herein construct receiver-based P2MP tunnels in a computer network. By computing P2MP extensions by a head-end node in response to receiving join requests from its receivers, the novel techniques take advantage of head-end node PCE computation. In particular, the dynamic aspects of one or more embodiments described herein alleviate the need for cumbersome and inefficient manual configuration. For instance, the embodiments described above dynamically add new leaves to a P2MP tunnel (or a set of diverse P2MP tunnels) for a set of multicast groups as join requests are received without user intervention, such as by dynamically stitching new leaves to a P2MP tunnel. Further, overhead on the tunnels, particularly large P2MP tunnels, is limited, such as by reducing the occurrence of requests, replies, and signaling messages used to dynamically stitch new leaves.

While there have been shown and described illustrative embodiments that construct receiver-based P2MP tunnels in a computer network, it is to be understood that various other adaptations and modifications may be made within the spirit and scope of the present invention. For example, the embodiments have been shown and described herein using particular protocols and signaling messages (e.g., PCEP, MPLS-TE, RSVP-TE, etc.). However, the embodiments of the invention in their broader sense are not so limited, and may, in fact, be used with other protocols and/or signaling messages. For instance, while the P2MP tunnels are described above as P2MP TE-LSPs, other types of P2MP tunnels may be used/signaled, such as Generic Route Encapsulation (GRE) tunnels, Generalized MPLS (G-MPLS) tunnels, etc.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   detecting a trigger to add a leaf node to a multicast group of a computer network;
   determining, by the leaf node, a root node of the multicast group;
   requesting from the root node a path between a tunnel tree of the multicast group and the leaf node; and
   in response to the multicast group having an existing tunnel tree, receiving a reply from the root node with a computed path to add the leaf node to the tunnel tree at a selected node of the tunnel tree, and adding the leaf node to the tunnel tree by stitching the computed path to the tunnel tree at the selected node.

2. The method as in claim 1, further comprising:
   in response to the multicast group not having an existing tunnel tree, receiving, from the root node, a request to establish a point-to-point (P2P) tree from the root node to the leaf node, and establishing the P2P tree to add the leaf node to the multicast group.

3. The method as in claim 1, further comprising:
   traversing one or more other nodes on the computed path.

4. The method as in claim 1, wherein adding further comprises:
   establishing a bi-directional tunnel from the leaf node to the selected node.

5. The method as in claim 1, wherein adding further comprises:
   requesting from the selected node a uni-directional tunnel to the leaf node; and establishing the uni-directional tunnel from the selected node to the leaf node.

6. The method as in claim 1, further comprising:
configuring the selected node to transmit multicast group traffic to the leaf node.

7. The method as in claim 1, wherein the multicast group has at least two diverse tunnel trees.

8. The method as in claim 7, further comprising:
receiving diverse computed paths corresponding to each diverse tunnel tree.

9. The method as in claim 1, wherein detecting further comprises:
receiving a multicast group join request at the leaf node.

10. The method as in claim 9, wherein the join request is a Protocol Independent Multicast (PIM) join request.

11. The method as in claim 1, wherein determining further comprises:
performing a lookup operation.

12. The method as in claim 1, wherein adding further comprises:
informing the selected node of the multicast group to which the leaf node is to be added.

13. The method as in claim 1, further comprising:
receiving a notification of establishment of a re-optimized tunnel tree to add a leaf node to the multicast group.

14. The method as in claim 13, further comprising:
adding the leaf node to the re-optimized tunnel tree according to the request.

15. The method as in claim 13, wherein a decision to establish the re-optimized tunnel tree is based on an optimized gain.

16. An apparatus, comprising:
one or more network interfaces;
one or more processors coupled to the network interfaces and adapted to execute one or more processes; and
a memory adapted to store a leaf node process executable by each processor, the leaf node process when executed operable to: i) detect a trigger to add the apparatus to a multicast group of a computer network; ii) determine a root node of the multicast group; iii) request from the root node a path between the apparatus and a tunnel tree of the multicast group; and iv) in response to the multicast group having an existing tunnel tree, receive a reply from the root node with a computed path to add the apparatus to the tunnel tree at a selected node of the tunnel tree, and add the apparatus to the tunnel tree by stitching the computed path to the tunnel tree at the selected node.

17. The apparatus as in claim 16, wherein the leaf node process is further operable to:
in response to the multicast group not having an existing tunnel tree, receive, from the root node, a request to establish a point-to-point (P2P) tree from the root node to the apparatus, and establish the P2P tree to add the apparatus to the multicast group.

18. The apparatus as in claim 16, wherein the leaf node process is further operable to:
add the apparatus to the tunnel tree through one of either a) establishment of a bi-directional tunnel from the leaf node to the selected node or b) a request from the selected node for a uni-directional tunnel to the apparatus and establishment of the uni-directional tunnel from the selected node to the leaf node.

19. The apparatus as in claim 16, wherein the multicast group has at least two diverse tunnel trees, and wherein the leaf node process is further operable to:
receive diverse computed paths corresponding to each diverse tunnel tree.

20. A method, comprising:
receiving, at a receiver router, a request to join a multicast group of a computer network from a locally attached receiver node of the network;
determining, by the receiver router, a source router responsible for a source node of the multicast group;
requesting, from the source router by the receiver router, a path from the multicast group to the receiver router;
determining, at the source router, whether a tunnel tree exists for the multicast group;
in response to a tunnel tree not existing for the multicast group, i) computing, by the source router, a Point-to-Point (P2P) tunnel over a path of the network from the source router to the receiver router; and ii) establishing the P2P tunnel; and
in response to a tunnel tree existing for the multicast group, i) computing, by the source router, a path between a selected router on the tunnel tree and the receiver router; ii) receiving, at the receiver router, the computed path; iii) establishing a bi-directional tunnel from the receiver router and the selected router, the establishment specifying the multicast group; and iv) stitching the bi-directional tunnel to the existing tunnel tree at the selected router as a portion of a Point-to-Multipoint (P2MP) tunnel for the multicast group.

21. An apparatus, comprising:
means for detecting a trigger to add a leaf node to a multicast group of a computer network;
means for determining, by the leaf node, a root node of the multicast group;
means for requesting from the root node a path between a tunnel tree of the multicast group and the leaf node;
means for receiving, in response to the multicast group having an existing tunnel tree, a reply from the root node with a computed path to add the leaf node to the tunnel tree at a selected node of the tunnel tree, and for adding the leaf node to the tunnel tree by stitching the computed path to the tunnel tree at the selected node.

* * * * *